United States Patent
Jam et al.

(10) Patent No.: US 7,224,891 B1
(45) Date of Patent: May 29, 2007

(54) DIGITAL PHOTOGRAPH PRESENTATION USING DVD PLAYERS

(75) Inventors: Mehrban Jam, Fremont, CA (US); Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1143 days.

(21) Appl. No.: 10/074,734

(22) Filed: Feb. 13, 2002

(51) Int. Cl.
*H04N 7/26* (2006.01)
*H04N 5/00* (2006.01)

(52) U.S. Cl. ..................... 386/111; 386/124

(58) Field of Classification Search ............. 386/68, 386/95–96, 124–126, 46, 111
See application file for complete search history.

(56) References Cited

U.S. PATENT DOCUMENTS

| | | | |
|---|---|---|---|
| 6,310,647 B1 * | 10/2001 | Parulski et al. | 348/231.99 |
| 6,424,795 B1 * | 7/2002 | Takahashi et al. | 386/120 |
| 6,907,188 B2 * | 6/2005 | Nonomura et al. | 386/95 |
| 6,970,640 B2 * | 11/2005 | Green et al. | 386/68 |
| 6,975,809 B1 * | 12/2005 | Eiref et al. | 386/125 |

OTHER PUBLICATIONS

FotoShow Family of Produts, iomega webpage [online] [retrieved on Feb. 11, 2002]. Retrieved from the internet:<URL:http//www.iomega.com/fotoshow.html>.

TV Photo Viewer, Home Page [online][retrieved on Feb. 11, 2002]. Retrieved from the internet:<URL:http//www.microsoft.com/hardware/tvphotoviewer/default.asp.html>.

* cited by examiner

*Primary Examiner*—Thai Q. Tran
*Assistant Examiner*—Nigar Chowdhury

(57) ABSTRACT

Method and apparatus for digital photograph presentation. A method for digital photograph presentation in accordance with one embodiment includes reading a still-picture file for a selected photograph from a DVD disk (402), transcoding (500) data from the still-picture file into a sequence of frames, and decoding and presenting the sequence. An apparatus for digital photograph presentation in accordance with one embodiment is a DVD player device (400 or 410) that includes a transcoder (404 or 412) for converting in real-time (see 500) still-picture files to sequences of frames, a navigator (406) for selecting the still-picture files and for controlling the transcoder (404 or 412) to direct presentation of the sequences. A method for digital photograph presentation in accordance with another embodiment includes encoding (300) onto a DVD disc (202) MPEG2 sequences that include the digital photographs as I-picture frames, inserting the DVD disc into a DVD player (200), and navigating amongst the MPEG2 sequences and displaying selected photographs using the DVD player (200). An apparatus for digital photograph presentation in accordance with another embodiment is a DVD player (400 or 410) that includes a navigator (204) for selecting the digital photographs encoded as MPEG2 sequences on a DVD disk (202), an MPEG2 decoder (104) for receiving and decoding the MPEG2 sequences, and a frame buffer (106) for buffering the decoded MPEG2 sequences to be output as at least one video signal from the DVD player.

21 Claims, 9 Drawing Sheets

Disc Encoding Process 300

Transcoding Process 500

DIGITAL PHOTOGRAPH PRESENTATION USING DVD PLAYERS

BACKGROUND OF THE INVENTION

1. Field of the Invention

The present invention relates generally to processing and presenting digital images.

2. Description of the Background Art

Digital cameras are becoming very popular, and there is an increasing need for presenting digital photographs in an economical and practical way. Existing methods for presenting digital photography to family and friends have drawbacks.

One existing method is displaying digital photographs on a computer screen. This method has a shortcoming in that often a desktop computer is not available in a family room where family members typically gather. In addition, if the computer is a laptop computer, laptop computer screens typically have a narrow viewing angle and are not suitable for viewing by several people at once.

Another existing method is displaying digital photographs on a television (TV) screen. This method is becoming more popular due to the ubiquity of TV sets, their larger screen sizes, and their wider viewing angles. Current techniques used to display digital photographs on a TV screen include a first technique where the photos are output via a video-output jack on some digital cameras, a second technique where software packages are used to create video "slide show" streams on VHS tape or CD/DVD disc, and a third technique where dedicated devices are used to create and display digital photo albums.

Regarding the first technique, not all digital cameras have such video-output jacks and incorporating such video-output jacks adds complexity and costs to digital cameras. In addition, such cameras generally will only display pictures taken with that camera. Further, not all TV sets have a video-input jack or one that is conveniently accessible.

The second technique uses a common VHS tape player or DVD player to play the video "slide show" streams. However, navigation is limited and awkward because the photos can only be displayed in a prearranged duration and sequence. Going back and forth is awkward, and jumping to a particular picture is not an enabled function.

Dedicated devices for the third technique include products made by Iomega Corporation of San Diego, Calif. and Microsoft Corporation of Redmond, Wash. The Iomega FOTOSHOW product creates a photo album on an Iomega ZIP disc. Similarly, the Microsoft TV PHOTO VIEWER product creates a photo album on a floppy disc. Such dedicated devices are additional products that the consumer needs to purchase. In addition, such dedicated devices disadvantageously require an additional hook-up to the TV system. Moreover, such dedicated devices are proprietary in nature and so are limited in compatibility and are more costly to produce. Furthermore, such dedicated devices are currently limited in the picture capacity of each disc.

BRIEF DESCRIPTION OF THE DRAWINGS

Non-limiting and non-exhaustive embodiments of the present invention are described in the Figures, in which.

SUMMARY

The present invention relates to a method and apparatus for digital photograph presentation. A method for digital photograph presentation in accordance with one embodiment includes reading a still-picture file for a selected photograph from a DVD disc, transcoding data from the still-picture file into a sequence of frames, and decoding and presenting the sequence. An apparatus for digital photograph presentation in accordance with one embodiment is a DVD player that includes a transcoder for converting in real-time still-picture files to sequences of frames and a navigator for selecting the still-picture files and for controlling the transcoder to direct presentation of the sequences.

A method for digital photograph presentation in accordance with another embodiment includes encoding onto a DVD disc MPEG2 sequences that include the digital photographs as I-picture frames, inserting the DVD disc into a DVD player, and navigating amongst the MPEG2 sequences and displaying selected photographs using the DVD player. An apparatus for digital photograph presentation in accordance with another embodiment is a DVD player that includes a navigator for selecting the digital photographs encoded as MPEG2 sequences on a DVD disc, an MPEG2 decoder for receiving and decoding the MPEG2 sequences, and a frame buffer for buffering the decoded MPEG2 sequences to be output as at least one video signal from the DVD player.

DETAILED DESCRIPTION

What is needed is a standard, economical and practical method and apparatus to display digital photographs in a home environment. Utilizing existing technology standards will increase compatibility and should result in reduced costs of production. Embodiments of the present invention may utilize various standards, for example, the DVD standard, the MPEG2 standard, and image compression standards such as JPEG (Joint Photographic Experts Group), PNG (Portable Network Graphics), and GIF (Graphics Interchange Format). In addition, embodiments of the present invention advantageously display digital photographs on TV sets that typically have larger screens and wider viewing angles than computer and laptop screens. Further, the digital photographs are displayed without the disadvantage of needing an additional hardware hook-up to the TV system.

Figure 1:
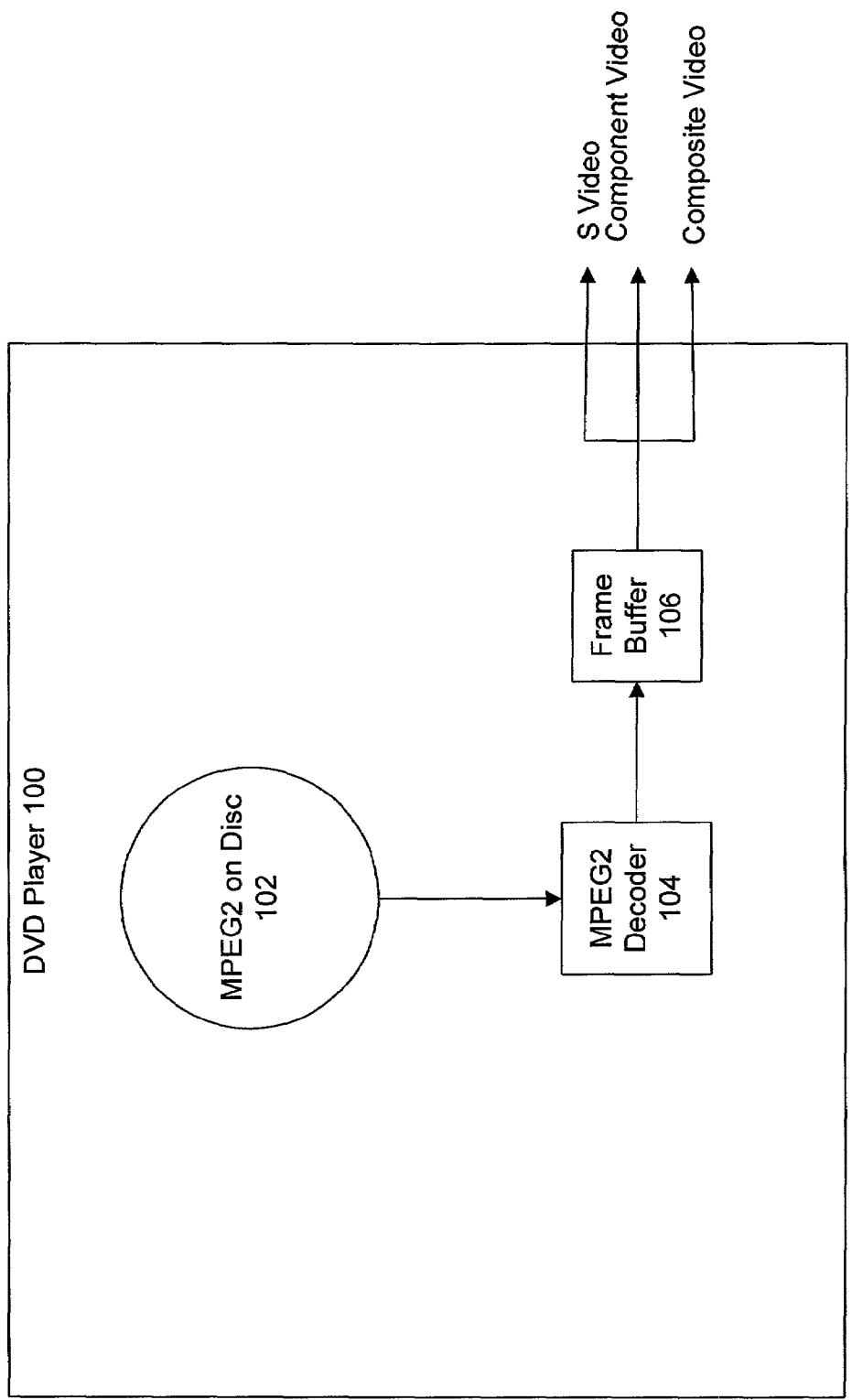
FIG. 1 is a diagram depicting a conventional DVD player.

FIG. 1 is a diagram depicting a conventional DVD (digital video disc or digital versatile disc) player 100. The conventional player 100 reads digital video from a DVD disc 102 in a form that is basically compatible with the MPEG2 standard of the Motion Pictures Expert Group. The digital video may be that for a movie, for example.

The digital video is processed by a MPEG2 decoder 104. The decoded video is received and buffered by a frame buffer 106, and one or more video signals are output. Example forms of output video signals include S video, component video, and composite video. The above description of a conventional DVD player 100 is, of course, a simplified one that describes only a few parts of the DVD player 100 as background for the present invention.

Figure 2:
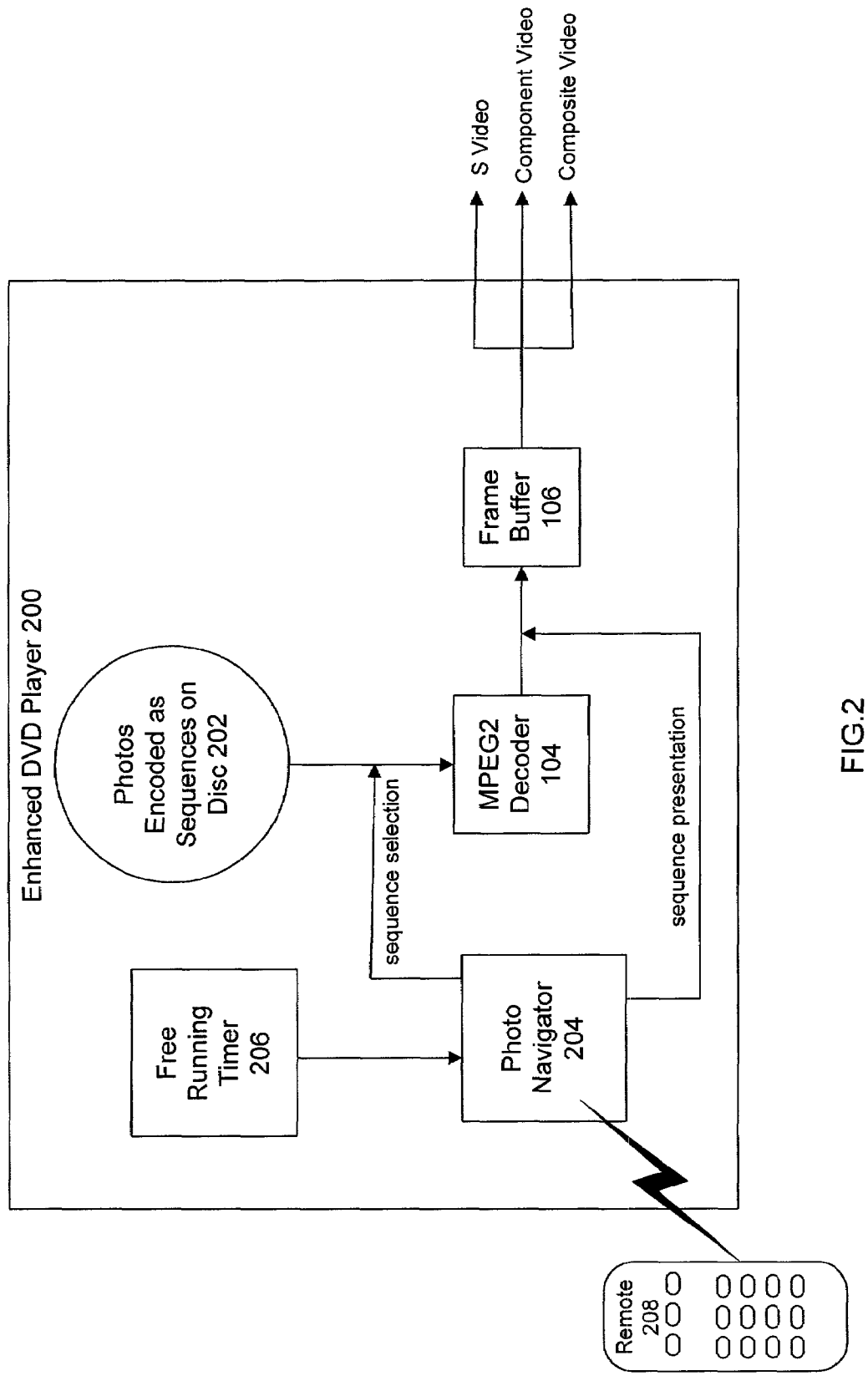
FIG. 2 is a diagram depicting an enhanced DVD player in accordance with one embodiment of the invention.

FIG. 2 is a diagram depicting an enhanced DVD player 200 in accordance with one embodiment of the invention. The player 200 is enhanced in that it adds photograph presentation capabilities to a conventional DVD player 100. This enhancement may be accomplished with little or no additional cost to the basic hardware of the conventional DVD player 100.

The DVD player 200 in this embodiment not only plays conventional digital video stored on conventional DVD discs, but it also navigates and presents digital photographs encoded in specific formats on DVD discs when in a photograph presentation mode. The DVD player 200 may be an enhanced version, for example, of a stand-alone DVD player or of a game player that can also player DVD videos (a game/DVD player).

The specific formats for photographs readable by the DVD player 200 comprise an encoded sequence with a key frame (I-picture frame in MPEG terminology) that includes the picture data and one or more dummy frames following the key frame. The encoded sequence begins with a sequence header and ends with a sequence end code. The header includes horizontal and vertical size information about the digital photograph to be displayed. The dummy frames comprise predicted frames that effectively repeat display of the key frame. A disc encoding process for storing digital photographs in the form of such encoded sequences onto the DVD discs is described further below in relation to FIG. 3.

The player 200 includes a photo navigator 204. The photo navigator 204 may be, for example, in the form of firmware in a stand-alone player 200 or in the form of "game" software for a game/DVD player. The photo navigator 204 controls the selection of the encoded sequences from the disc 202. The photo navigator 204 also directs the presentation of the encoded sequences. In one embodiment, this may be done by effectively "pausing" the display of a sequence until the navigator 204 sends a command for a next sequence to be displayed.

The photo navigator 204 may receive user commands via a remote control 208. In accordance with one embodiment, the remote 208 comprises a conventional DVD remote control where buttons (or other similar input mechanisms) are re-used to provide user commands to the photo navigator 204 (in addition to their use to provide user commands to control other conventional functions of the DVD player 200). Re-use of the remote buttons to provide user commands directing the photo navigation is described further below in relation to FIGS. 6-8. In addition or alternatively, a free running timer 206 may be used to provide timing for the presentation of the digital photographs. For example, the timer 206 may be used in timing the selection of the digital photographs so as to present them in a "slide-show" type format. The timer 206 may be implemented, for example, as a software module that utilizes a system clock of the player 200.

Figure 3:
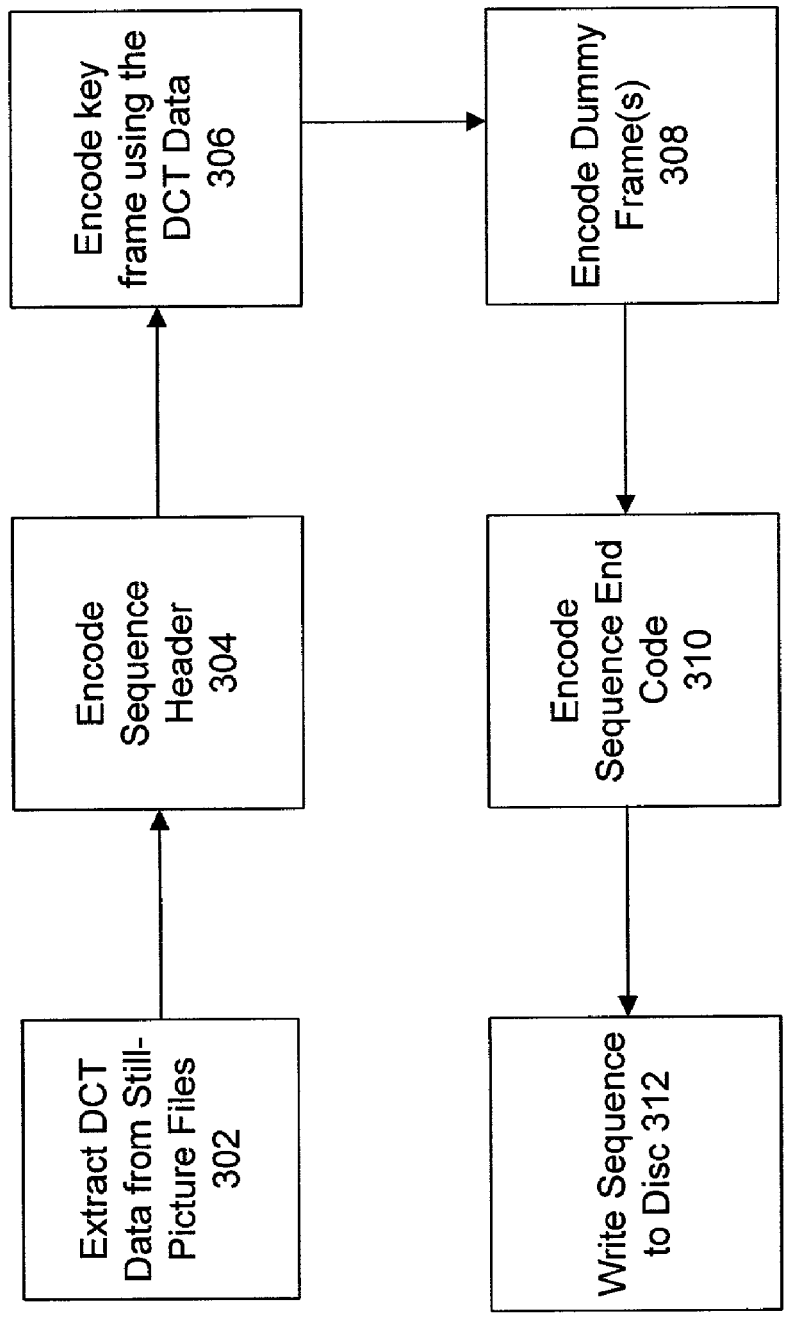
FIG. 3 is a flow diagram depicting a disc encoding process in accordance with one embodiment of the invention.

FIG. 3 is a flow diagram depicting a disc encoding process 300 in accordance with one embodiment of the invention. The disc encoding process 300 may be performed, for example, on a personal computer or other computing apparatus by software configured to implement the process. The process 300 as depicted includes six steps.

In a first step 302, photographic image data is extracted by the computing device from a still-picture file. The still-picture file may be in the form, for example, of a compressed image file such as a JPEG file, a PNG file, or a GIF file. The photographic image data in such files typically comprise DCT (discrete cosine transform) data.

In a second step 304, a sequence header is encoded for insertion at the beginning of the sequence being constructed. The sequence header may be in the form, for example, of a MPEG2 sequence header. The sequence header may include a sequence header code. The sequence header may also include data relating to the photographic image, for example, the horizontal and vertical sizes of the photo. Also included may be the aspect ratio, such as a pel (picture element) aspect ratio (PAR) for reconstruction of the frame of the photographic image. Such information would be specific to the photo being encoded and may be obtained from or derived using data in the still-picture file.

In a third step 306, a first frame is encoded to be inserted after the sequence header. This first frame is encoded as a key frame that includes the photographic image data extracted in the first step 302. The key frame may be in the form, for example, of an I-picture under the MPEG2 video standard.

In a fourth step 308, one or more dummy frames may be encoded to be inserted following the key frame. A dummy frame may be in the form, for example, of a predicted frame that indicates zero difference between it and the key frame. For instance, the predicted frame may have null motion vectors and zero prediction error in order to achieve the effect of a dummy frame. The dummy frame(s) are used to provide some delay between key frames. Such a delay may be necessary due to system limitations or for proper navigational control. For example, a minimum of one-half second may be needed by the DVD player 200 in order to give it sufficient time to automatically pause the video stream to display the still-picture. In that example, at least fourteen dummy frames would have to be encoded so that the sequence includes fifteen frames at a display rate of thirty frames per second. If one second were needed, then at least twenty-nine dummy frames would have to be encoded. If one-tenth of a second were needed, then at least two dummy frames would have to be encoded.

In a fifth step 310, a sequence end code is encoded to be inserted at the end of the sequence being constructed. The sequence end code may be in the form, for example, of a MPEG2 sequence end code. The sequence end code terminates the video sequence for the photographic image being encoded.

Finally, in a sixth step 312, the sequence from header to end code is written on a disc 202 that can be read by the enhanced DVD player 200. For example, it may be written onto a DVD disc or a CD disc (for DVD players that can also read CD discs). Subsequently, the process 300 may be repeated to encode another photo by starting again at the first step 302.

Note that among the second through fifth steps 304-310, those steps need not necessarily be done in serial. Those steps may be done in any order or in parallel with the other steps. The order of the second through fifth steps 302-310 in FIG. 3 merely follows the order of the encoded pieces (header/key frame/dummy frames/end code) within the sequence eventually written on disc in the sixth step 312.

Figure 4A:
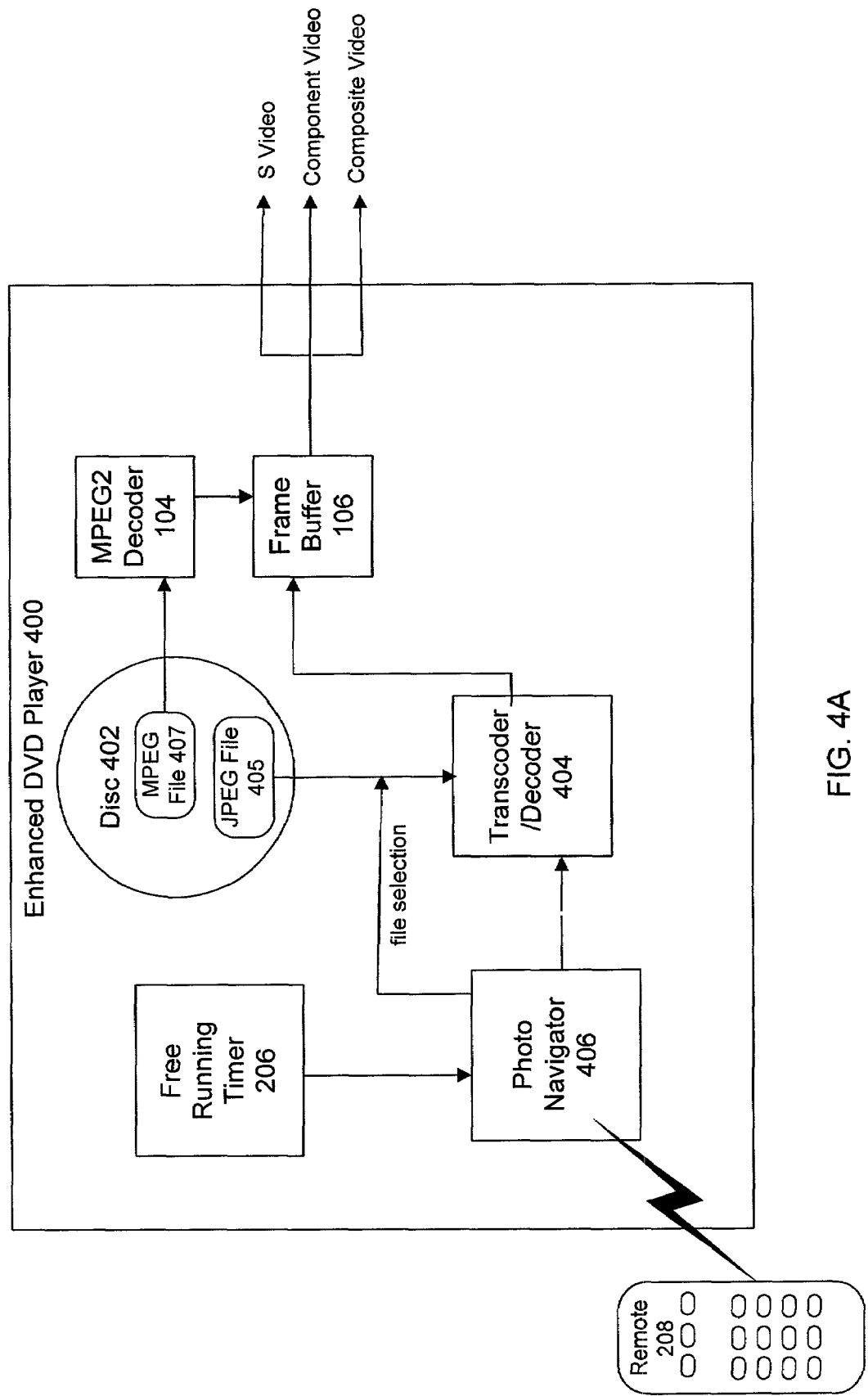
FIG. 4A is a diagram depicting an enhanced DVD player in accordance with another embodiment of the invention.

FIG. 4A is a diagram depicting an enhanced DVD player 400 in accordance with another embodiment of the invention. The player 400 is also enhanced in that it adds photograph presentation capabilities to a conventional DVD player 100. This enhancement may be accomplished with small additional cost to the basic hardware of the conventional DVD player 100.

The DVD player 400 in this embodiment not only is capable of playing conventional digital video stored on conventional DVD discs, but it also is capable of navigating and presenting digital photographs stored in standard formatted files on those DVD discs. The DVD player 400 may be an enhanced version, for example, of a stand-alone DVD player or of a game player that can also play DVD videos (a game/DVD player).

Various standard formats for storing still-picture files on DVD discs 402 may be readable by the player 400. These include, for example, JPEG files, PNG files, and GIF files. Such files typically include photographic image data stored using DCT (discrete cosine transform) type compression. The still-picture files may be stored along with video files on a DVD disc 402 (as illustrated in FIG. 4A by the JPEG 405 and MPEG2 407 files stored thereon).

The player 400 includes a transcoder/decoder 404. The transcoder/decoder 404 reads a still-picture file (for example, a JPEG file 405) and outputs a decoded video sequence. For example, the transcoder/decoder 404 may be in the form of application-specific hardware or a high-speed general-purpose processor controlled by appropriate software instructions. The application-specific hardware would be in addition to components in a conventional player 100. Utilization of the high-speed general-purpose processor, either a microprocessor or a digital signal processor, may be particularly feasible in game players that have processors of sufficient power. The operation of the transcoder/decoder 404 may be divided, conceptually, into transcoding and decoding functions. The transcoding function converts (transcodes) the still-picture file into an encoded video sequence. The decoding function decodes the encoded video sequence. Both these two functions may be performed by the transcoder/decoder 404. Alternatively, the transcoder/decoder 404 may more directly go from the still-picture file to the decoded video sequence, without creation of the encoded video sequence in an intermediate processing step.

The player 400 also includes a photo navigator 406 for navigation in the photographic presentation mode. The photo navigator 406 may be, for example, in the form of firmware in a stand-alone player or in the form of "game" software for a game/DVD player. The photo navigator 406 controls the selection of the encoded sequences from the disc 402. The photo navigator 406 also controls the transcoder/decoder 404 and by doing so directs the presentation of the sequences. In one embodiment, this may be done by effectively "pausing" the display of a sequence until the navigator 406 sends a command for a next sequence to be displayed.

As described above in relation to FIG. 2, the photo navigator 406 may receive user commands via a remote control 208. In accordance with one embodiment, the remote 208 comprises a conventional DVD remote control where buttons (or other similar input mechanisms) are re-used to provide user commands to the photo navigator 406 (in addition to their use to provide user commands to control other conventional functions of the DVD player 400). Re-use of the remote buttons to provide user commands directing the photo navigation is described further below in relation to FIGS. 6-8. In addition or alternatively, a free running timer 206 may be used to provide timing for the presentation of the digital photographs. For example, the timer 206 may be used in timing the selection of the digital photographs so as to present them in a "slide-show" type format. The timer 206 may be implemented, for example, as a software module that utilizes a system clock of the player 400. As also described above, an MPEG2 decoder 104 may read and process MPEG file 407.

Figure 4B:
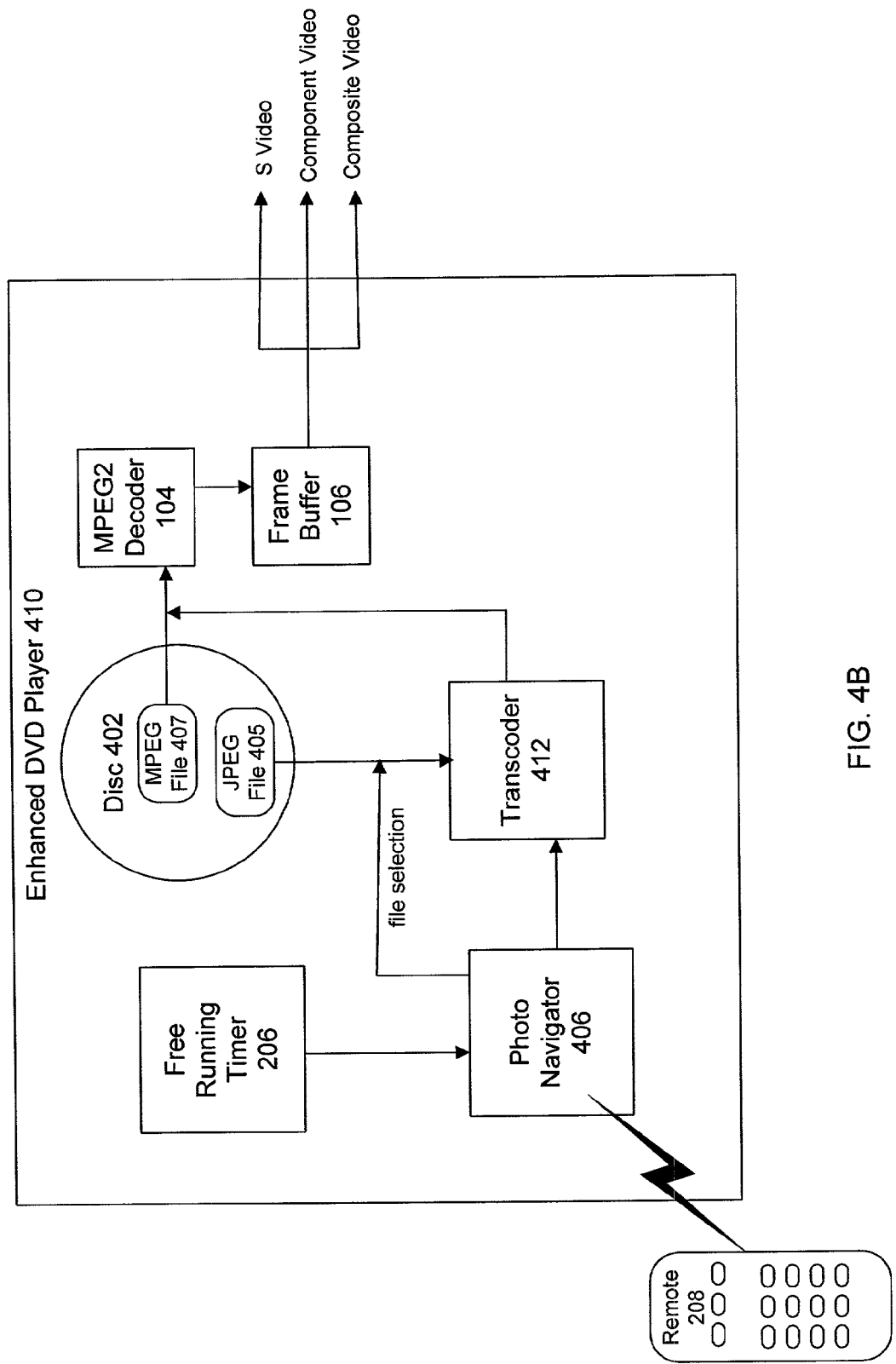
FIG. 4B is a diagram depicting an enhanced DVD player in accordance with another embodiment of the invention.

FIG. 4B is a diagram depicting an enhanced DVD player 410 in accordance with another embodiment of the invention. The player 410 in FIG. 4B is similar to the player 400 in FIG. 4A. The difference is that the player 410 in FIG. 4B has a transcoder 412 and re-utilizes the conventional MPEG2 decoder 104 while the player 400 in FIG. 4A has a transcoder/decoder 404. The transcoder 412 reads a still-picture file (for example, a JPEG file 405) and converts it into an encoded video sequence. For example, the transcoder 412 may be in the form of application-specific hardware or a high-speed general-purpose processor controlled by appropriate software. The output of the transcoder 412 is directed to the conventional MPEG2 decoder 104 for decoding.

Figure 5:
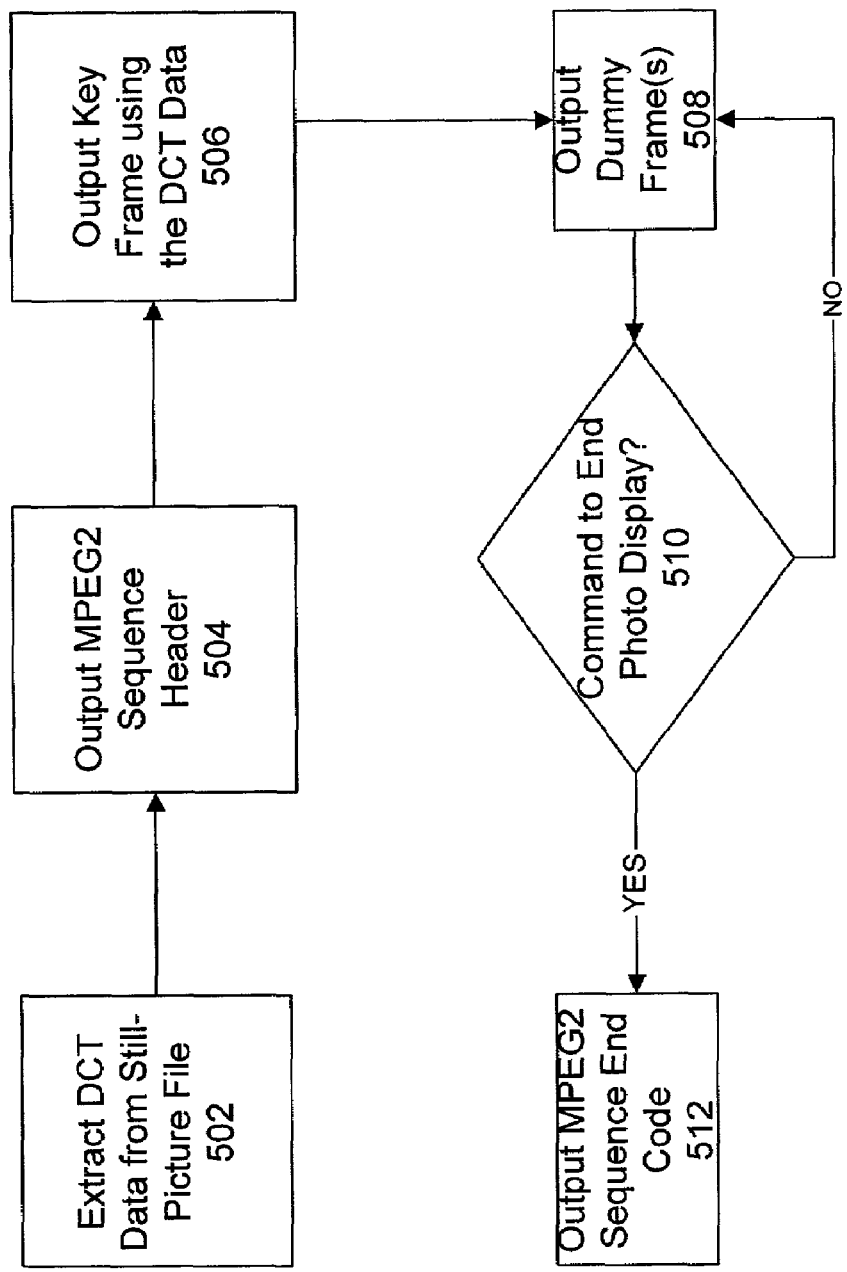
FIG. 5 is a flow diagram depicting a transcoding process in accordance with an embodiment of the invention.

FIG. 5 is a flow diagram depicting a transcoding process 500 in accordance with an embodiment of the invention. The transcoding process 500 may be performed, for example, in the transcoder/decoder 404 of FIG. 4A or in the transcoder 412 of FIG. 4B. With a transcoder device of sufficient processing speed, the encoding of the key frame may be done in real-time. The process 500 as depicted includes six steps.

In a first step 502, photographic image data is extracted from a still-picture file. The still-picture file may be in the form, for example, of a compressed image file such as a JPEG file, a PNG file, or a GIF file. The photographic image data in such files typically comprise DCT (discrete cosine transform) data.

In a second step 504, a sequence header is output to indicate the beginning of the sequence being constructed. The sequence header may be in the form, for example, of a MPEG2 sequence header. The sequence header may include a sequence header code. The sequence header may also include data relating to the photographic image, for example, the horizontal and vertical sizes of the photo. Also included may be the aspect ratio, such as pel (picture element) aspect ratio (PAR) for reconstruction of the frame of the photographic image. Such information would be specific to the photo being transcoded and may be derived using data in the still-picture file.

In a third step 506, a key frame is output. The key frame includes the photographic image data extracted in the first step 502. The key frame may be in the form, for example, of an I-picture under the MPEG2 video standard.

In a fourth step 508, one or more dummy frames is output. A dummy frame may be in the form, for example, of a predicted frame that indicates zero difference between it and the key frame. For instance, the predicted frame may have null motion vectors and zero prediction error in order to achieve the effect of a dummy frame. While dummy frames are being presented, the display should be a static image of the key frame. This is because the dummy frames indicate no change from the key frame.

In a fifth step 510, a determination is made as to whether or not a command has been received to end the display of the photograph. Such a command may be received, for example, from the photo navigator 406. More than one navigation command may end the display of the photograph. For example, a command to display another photograph would end the display of the current photograph. In addition, a command to go out of photograph display mode would also end the display of the current photograph. If no such a command to end display of the current photograph has been received, then the process loops back to the fourth step 508 and one or more dummy frames are output. (If a maximum number of frames allowable in a sequence of frames would otherwise be exceeded, then an end code, a sequence header, and a repeat of the key frame may be required to be output prior to going to the fourth step 508 in order to circumvent such maximum number of frames.) On the other hand, if a command has been received to end the display, then the process moves forward to the sixth step 512.

Finally, in a sixth step 512, a sequence end code is output. The sequence end code may be in the form, for example, of a MPEG2 sequence end code. The sequence end code terminates the video sequence for the photographic image being encoded. Subsequently, the process 500 may be repeated to display another photograph by starting again at the first step 502.

Figure 6:
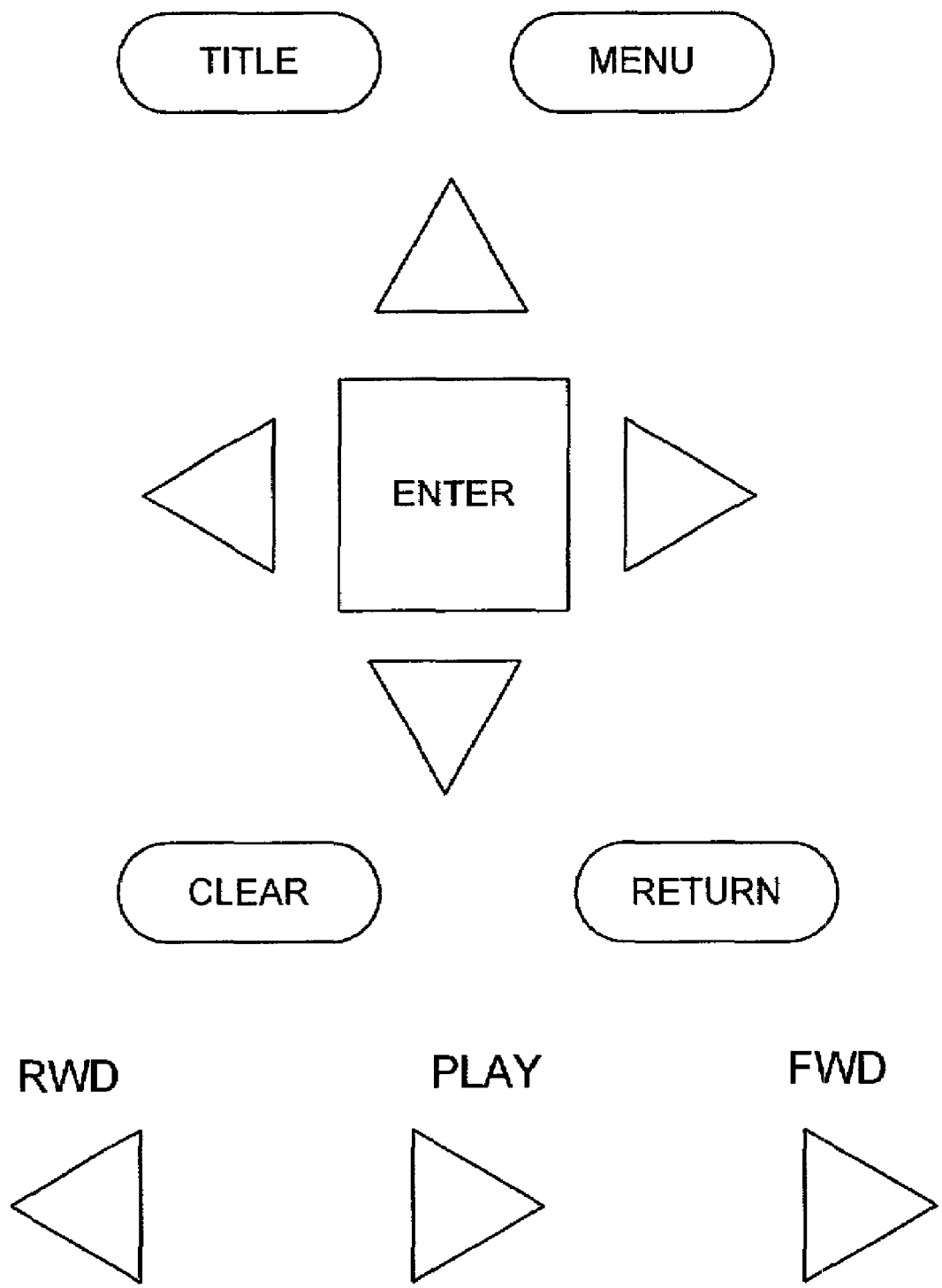
FIG. 6 is a diagram depicting buttons on a remote control in accordance with an embodiment of the invention.

FIG. 6 is a diagram depicting buttons on a remote control in accordance with an embodiment of the invention. The buttons shown include a Title button, a Menu button, an Enter button, four arrow (up/down/left/right) buttons around the Enter button, a Clear button, a Return button, a Rewind (Rwd) button, a Play button, and a fast forward (Fwd) button. The specific buttons and layout thereof are presented as an example for purposes of illustration and explanation. Remote controls with different layouts and varying buttons are contemplated as also being usable within the scope of the present invention.

Figure 7:
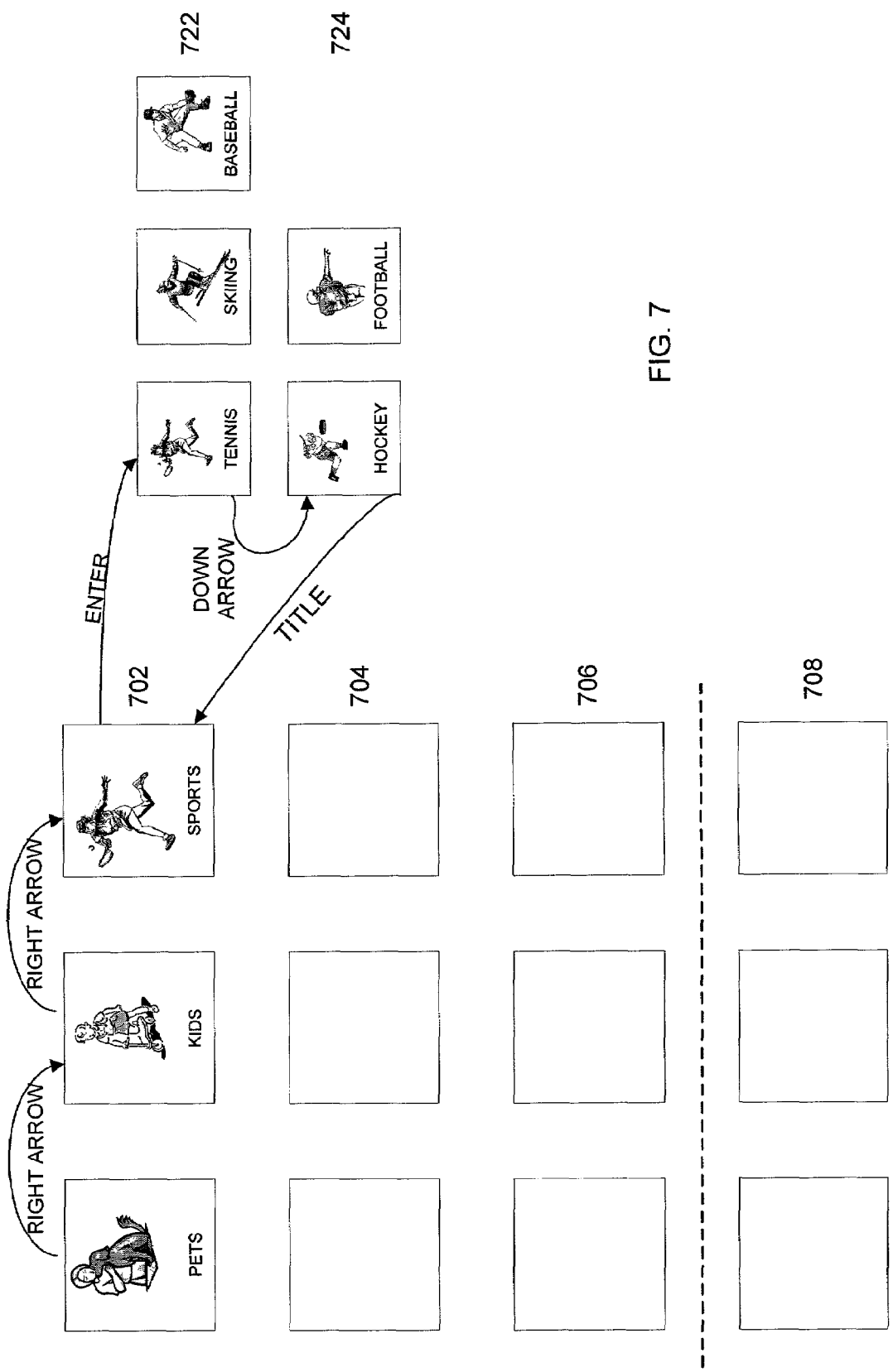
FIG. 7 is a diagram depicting a directory structure and navigation thereof in accordance with an embodiment of the invention.

FIG. 7 is a diagram depicting a directory structure and navigation thereof in accordance with an embodiment of the invention. The directories (or folders) may be created and named by the user during creation or editing of the DVD.

The rows 702, 704, 706, and 708 on the left in FIG. 7 illustrate one level of directories for digital photographs on a DVD that may be navigated by a photo navigator 204 or 406. For example, the first row 702 shows three directories named Pets, Kids, and Sports. (Other rows are blank to simplify the illustration, but they would of course be named in actuality.) In one embodiment, an icon (a small graphic image, or perhaps a "thumbnail" picture of one of the photos within the directory) may be used to make the directory more visually identifiable. A dashed line below the third row 706 is used to indicate that only the first three rows 702, 704, and 706 may be displayed on the TV screen at first due to limited size (resolution) of televisions. An arrow or other indication may indicate to the user that more directories are present at this level, and that the user needs to navigate (scroll) down to display on screen those other directories. The fourth row 708 below the dashed line includes such off-screen directories.

The rows 722 and 724 on the right in FIG. 7 illustrate a second level of directories for the digital photographs on the DVD. In the particular example shown in FIG. 7, the second level shown includes subdirectories (Tennis, Skiing, Baseball, Hockey, and Football) of the Sports directory.

Navigation of the directory structure is also illustrated in FIG. 7 by the arrows between directories. Consider an example where a user begins with the Pets directory "highlighted" for selection. By pressing the right arrow button, the user navigates to the Kids directory (i.e. the Kids directory becomes highlighted for selection). Another press of the right arrow button goes to the Sports directory. Once the Sports directory is highlighted for selection, the user presses the Enter button to move down one level in the directory structure. This takes the user to a screen that now shows the rows 722 and 724 on the right of FIG. 7. Navigation at this level may begin at the Tennis directory. To move to the Hockey directory, the user would press the down arrow button. Then, in this example, the user wants to go back to the higher level directory. To do so, the user presses the Title button that moves the user back up one directory level. This takes the user back to a screen that shows the rows 702, 704, and 706 on the left of FIG. 7. Navigation back at this level may start at the Sports directory since the user is returning from that directory. Of course, the preceding navigation path is for purposes of illustration to give an example of a user using a remote control to navigate the directory structure.

Figure 8:
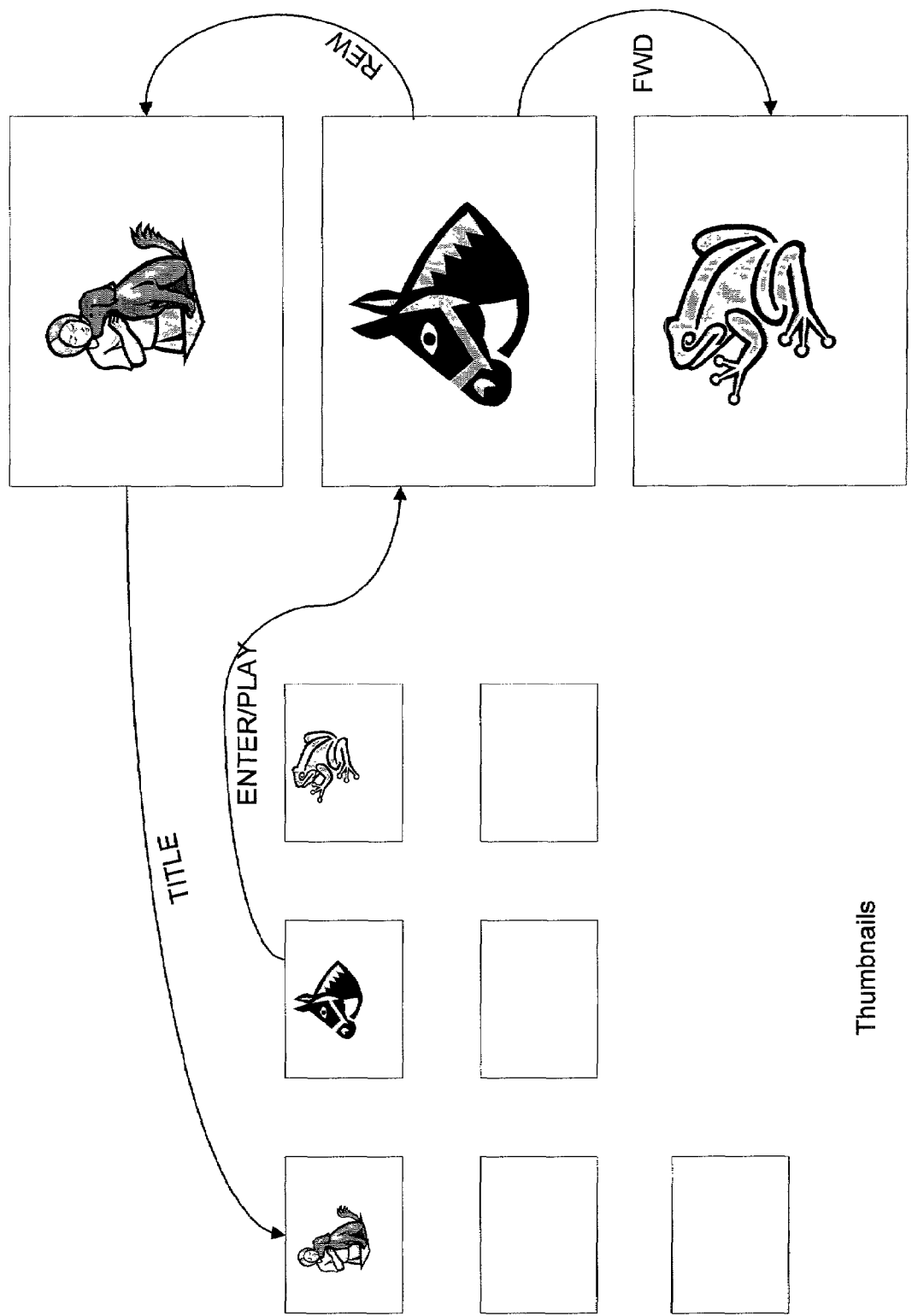
FIG. 8 is a diagram depicting thumbnail and full-sized representations and navigation thereof in accordance with an embodiment of the invention.

FIG. 8 is a diagram depicting thumbnail and full-sized representations and navigation thereof in accordance with an embodiment of the invention. The left of FIG. 8 illustrates a screen of thumbnail (reduced-sized) representations of the photos in an example directory. (Other rows are blank to simplify the illustration.) For purposes of illustration, consider a user that has selected the thumbnail of the horse. To view the larger size version of that photograph, the user presses the Play button (alternatively, the user may press the Enter button). This brings up the larger (usually full-size) version of the horse photograph. To navigate to the next photo (of the frog), the user may press the Fast Forward (FWD) button. To navigate to the previous photo (of the person and dog), the user may press the Rewind (REW) button. In this example navigation path, consider that the user pressed Rewind to display the larger size version of the person and dog photo. At that point, for example, the user may press the Title button to go back up one level to the directory of thumbnails. Navigation back at this level may start at the person and dog photo since the user is returning from that photo. Of course, the preceding navigation path is for purposes of illustration to give en example of a user using a remote control to navigate among thumbnails and full-screen displays of photographs.

In the above description, numerous specific details are given to provide a thorough understanding of embodiments of the invention. However the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for presenting photographs for display using a DVD player, the method comprising:

reading a still-picture file for a selected photograph from the DVD disc, wherein the still-picture file includes only a single compressed digital photograph and does not include any digital video frames;

transcoding data from the still-picture file into a sequence of frames, wherein transcoding includes extracting DCT data from the still-picture file and encoding and outputting a key picture frame using the DCT data, and wherein the sequence of frames includes the key picture frame and dummy frames that indicate zero difference between the key picture frame and the dummy frames; and decoding and presenting the sequence of frames.

2. The method of claim 1 further comprising:

selecting a photograph presentation mode of the DVD player; and navigating amongst still-picture files stored in a directory structure on a DVD disc to select the photograph for presentation.

3. The method of claim 2, wherein the transcoding further comprises:

outputting a sequence header prior to a key picture frame;

outputting the dummy frames after the key picture frame while the selected photograph is to be presented; and outputting a sequence end code to stop presentation of the selected photograph.

4. A DVD player configured to present digital photographs for display, the DVD player comprising:

a transcoder for converting still-picture files of selected photographs to sequences of frames, wherein each still-picture file contains data representing only a single digital photograph and the still-picture files comprise one of a JPEG, GIF, and PNG files, and wherein converting the still-picture files of selected photographs to sequences of frames includes extracting DCT data from the still-picture files and encoding and outputting a key picture frame using the DCT data, wherein the sequences of frames includes the key picture frame and dummy frames that indicate zero difference between the key picture frame and the dummy frames; and a navigator for selecting the still-picture files and controlling the transcoder to direct presentation of the sequences.

5. The DVD player of claim 4, wherein the transcoder further:

encodes a sequence header, including height and width information, to be inserted prior to each key picture frame;

encodes the dummy frames to be inserted after the key picture frame while the selected still-picture is to be presented; and encodes a sequence end code to be inserted after the dummy frames so as to stop presentation of the selected still-picture.

6. The DVD player of claim 4 further comprising:

a free running timer for use by the navigator in timing the selection of the still-picture files so as to present the selected still-picture slides in a slide show format.

7. The DVD player of claim 4 further comprising:

a remote control for sending commands to the navigator to control the selection and presentation of the still-picture files, wherein buttons for controlling presentation of a DVD movie are re-used to control the presentation of the still-picture files.

8. The DVD player of claim 7, wherein the remote control comprises:

a first button that is re-used to function as a display picture control;

a second button that is re-used to function as a previous picture control; and a third button that is re-used to function as a next-picture control.

9. The DVD player of claim 8, wherein the remote control further comprises:

a set of buttons that are re-used to navigate through a directory structure of still-picture files, wherein the set of buttons includes a button that functions as a one-level up in the directory structure and a button that functions as a one-level down in the directory structure.

10. The DVD player of claim 4 further comprising:

a frame buffer for buffering the sequences to be output as at least one video signal from the DVD player, wherein the transcoder outputs the sequences to a decoder, and wherein the decoder decodes the sequences prior to the sequences being sent to the frame buffer.

11. The DVD player of claim 4, wherein the DVD player also comprises a game machine.

12. The DVD player of claim 11, wherein the navigator comprises software in form of a game product.

13. A DVD player configured to present digital photographs for display, the DVD player comprising:

a navigator for selecting the digital photographs, wherein the digital photographs are single frames converted from still-picture files each containing data representing only a single digital photograph and encoded as MPEG2 sequences and stored in an accessible directory structure on a DVD disc, and wherein the still-picture files comprise one of a JPEG, GIF, and PNG files, and wherein encoding the still picture files into MPEG2 sequences includes extracting DCT data from the still-picture files and encoding and outputting a key picture frame using the DCT data, wherein the MPEG2 sequences including the key picture frame and dummy frames that indicate zero difference between the key picture frame and the dummy frames;

an MPEG2 decoder for receiving and decoding the MPEG2 sequences; and a frame buffer for buffering the decoded MPEG2 sequences to be output as at least one video signal from the DVD player.

14. The DVD player of claim 13 further comprising:

a free running timer for use by the navigator in timing the selection of the MPEG2 sequences so as to present the selected digital photographs in a slide show format.

15. The DVD player of claim 13 further comprising:

a remote control for sending commands to the navigator to control the selection and presentation of the digital photographs.

wherein buttons for controlling presentation of a DVD movie are re-used to control the presentation of the digital photographs.

16. The DVD player of claim 15, wherein the remote control comprises:

a first button that is re-used to function as a display picture control;

a second button that is re-used to function as a previous picture control; and a third button that is re-used to function as a next picture control.

17. The DVD player of claim 16, wherein the first button comprises a play button, the second button comprises a rewind button, and the third button comprises a fast forward button.

18. A DVD player configured to present digital photographs for display, the DVD player comprising:

means for reading a still-picture file for a selected photograph from the DVD disc, wherein the still-picture file is one of a plurality of still-picture files and each still-picture file contains data representing only a single digital photograph and the still-picture file comprises one of a JPEG, GIF, and PNG file;

means for transcoding data from the still-picture file into a video sequence, wherein transcoding includes extracting DCT data from the still-picture file and encoding and outputting a key picture frame using the DCT data, and wherein the video sequence includes the key picture frame and dummy frames that indicate zero difference between the key picture frame and the dummy frames; and means for decoding and presenting the video sequence.

19. The DVD player of claim 18, wherein the DVD player comprises a game console, and wherein the means for navigating comprises software product for the game console.

20. The DVD player of claim 18, wherein the DVD player comprises a stand-alone DVD player.

21. A computer readable storage medium on which is embedded one or more computer programs, said one or more computer programs implementing a method for presenting photographs for display using a DVD player, said one or more computer programs comprising a set of instructions for:

reading a still-picture file for a selected photograph from the DVD disc, wherein the still-picture file is one of a plurality of still-picture files and each still-picture file contains data representing only a single digital photograph and the still-picture file comprises one of a JPEG, GIF, and PNG file;

transcoding data from the still-picture file into a sequence of frames, wherein transcoding includes extracting DCT data from the still-picture file and encoding and outputting a key picture frame using the DCT data, and wherein the sequences of frames includes the key picture frame and dummy frames that indicate zero difference between the key picture frame and the dummy frames; and decoding and presenting the sequence of frames.

* * * * *

UNITED STATES PATENT AND TRADEMARK OFFICE
CERTIFICATE OF CORRECTION

PATENT NO. : 7,224,891 B1  
APPLICATION NO. : 10/074734  
DATED : May 29, 2007  
INVENTOR(S) : Mehrban Jam et al.

It is certified that error appears in the above-identified patent and that said Letters Patent is hereby corrected as shown below:

In column 1, line 13, delete "photography" and insert -- photographs --, therefor.

In column 3, line 22, delete "player" and insert -- play --, therefor.

In column 6, line 41, after "such as" insert -- a --.

In column 10, line 33, in Claim 13, delete "including" and insert -- includes --, therefor.

In column 10, line 48, in Claim 15, delete "photographs." and insert -- photographs, --, therefor.

In column 12, line 15, in Claim 21, delete "sequences" and insert -- sequence --, therefor.

Signed and Sealed this

Twenty-ninth Day of September, 2009

David J. Kappos  
*Director of the United States Patent and Trademark Office*